April 1, 1947.   J. H. GRAYSON   2,418,257
INSERTED TOOTH MILLING CUTTER
Filed March 30, 1944

Inventor:
John H. Grayson
Andrew P. Wintercorn
Atty.

Patented Apr. 1, 1947

2,418,257

UNITED STATES PATENT OFFICE 2,418,257

INSERTED TOOTH MILLING CUTTER

John H. Grayson, Monrovia, Calif., assignor, by mesne assignments, to Lowell and Grayson Manufacturing Company, Monrovia, Calif., a corporation of California Application March 30, 1944, Serial No. 528,719

11 Claims. (Cl. 29—105)

This invention relates to milling cutters, and is more particularly concerned with a new and improved inserted tooth type end mill.

The principal object of my invention is to provide a milling cutter so designed that the cutting members can be inserted accurately and securely with ease and facility by a relatively unskilled workman, the design being particularly suited to end milling cutters of relatively small diameter, where the small space available places a definite limitation upon the type of inserted tooth construction that is feasible.

A salient feature of the milling cutter of my invention is the use of an axially disposed plug inserted in a hole in the body of the cutter with a press fit for accuracy, but having radial clearance with respect to the radially slotted portion of the body in which the cutting members are mounted, whereby a clamping action is obtained by the threading of screws radially into the latter portion of the plug from the slotted portion of the body, the cutting members having end portions projecting from the slotted end of the body for end milling. The plug, in addition to forming the central part of the clamping means, serves as a radial abutment for all of the inserted cutters to insure accurate location radially, and the inner ends of the enlarged portions of the slots act as thrust abutments for accuracy in location longitudinally with respect to the cutter body.

The invention is illustrated in the accompanying drawing in which—

The same reference numerals are applied to corresponding parts throughout these views.

Figure 1:
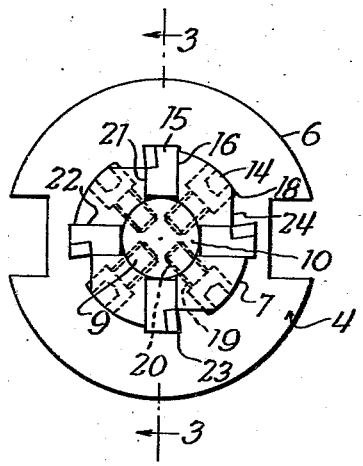
Fig. 1 is an end view of a milling cutter made in accordance with my invention.
Figure 2:
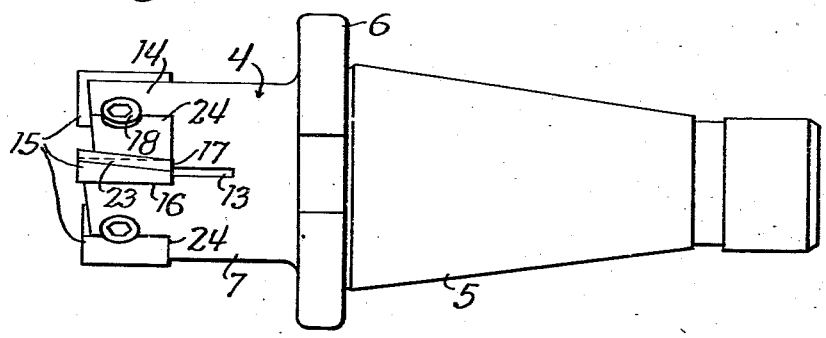
Fig. 2 is a side view of the cutter.
Figure 3:
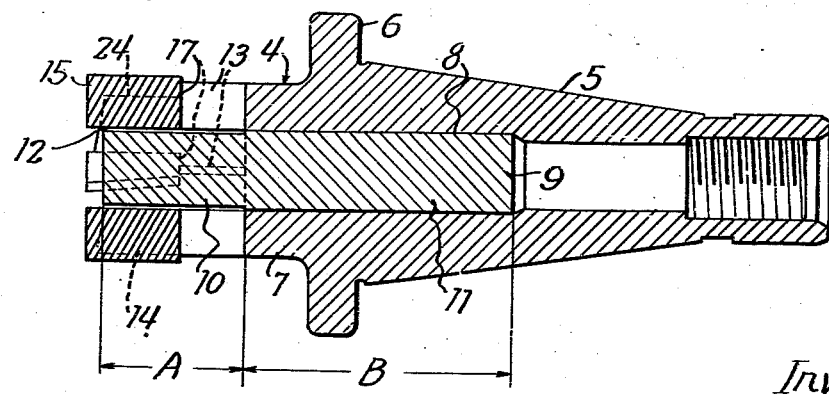
Fig. 3 is a longitudinal section on line 3—3 of Fig. 1.

The milling cutter illustrated comprises a body member indicated generally by the reference numeral 4, having a tapered shank portion 5 machined to fit standard milling machine spindles, to which the body member is adapted to be fastened in any usual way by means of the diametrically-notched flange 6. The projecting head portion 7 of the body member is generally cylindrical, and, of course, truly coaxial with respect to the shank portion 5. An axial hole 8 is provided in the body member into which a cylindrical plug 9 is entered with a press fit for close accuracy in the mounting of the plug axially with respect to the body. The outer end portion 10 of the plug is of slightly reduced diameter, but truly coaxial with respect to the inner end portion 11; that is to say, the length A is a few thousandths of an inch smaller in diameter than the length B, whereby to provide a radial clearance at 12 of, say, .002" to about .005" with respect to the outer end portion 10 of the plug 9 in the bore of the radially slotted portion 13 of the head end 7 of the body member. The radial slots 13 extend from the extremity of the head end 7 inwardly, to the extent indicated in Figs. 2 and 3, and thereby define clamping jaws 14 therebetween, which are contractable radially inwardly, toward the outer end portion 10 of the plug 9 to the extent permitted by the clearance 12, whereby to clamp the inserted teeth or cutting members 15. The slots 13 are cut to greater width at their outer end portions 16, as best appears in Fig. 2, to provide room enough for the inserts 15 and also to provide shoulders 17 at the inner ends of these widened portions, for abutment with the inner ends of the inserts to assume the end thrust, the inserts being also accurately located longitudinally with respect to the head portion 7 of the cutter body, by engagement with these shoulders. The inserts 15 have abutment on the periphery of the outer end portion 10 of the plug 9, as most clearly appears in Fig. 1, and are thereby accurately located radially with respect to the head portion 7 of the body member. Screws 18 are entered freely through radial holes 19 in the jaw portions 14 and thread in registering holes 20 provided in the outer end portion 10 of the plug 9. When these screws are tightened, the jaws 14 are contracted into tight clamping engagement with the inserts 15 by reason of the wedge-shaped cross-section of the jaws 14 (see Fig. 1) in which the clamping faces 21 and 22 on the opposite sides of the jaws are clearly illustrated as converging inwardly. The inserted teeth 15 may be of any suitable or preferred type and construction, but are herein illustrated as being of generally rectangular cross-section and provided with sintered carbide cutting edge portions 23. The jaws 14 are all illustrated as having cut-away portions 24 adjacent the fronts of the inserts for chip clearance.

It should be clear from the foregoing description, that I have provided an inserted tooth end mill of relatively simple and practical construction, and one which may be made at reasonably low cost. The present design makes possible an end milling cutter of the inserted tooth type as small as 1½" in diameter, so that there is very little cost involved in replacing a broken tooth with a stock part, whereas, if the cutter were solid as they now are in the smaller diameters, the whole cutter would have to be discarded in most cases, in the event of a broken tooth. When these inserted tooth cutter members are ground and reground after use, they can be replaced at a nominal expense. For a milling cutter where heavy cuts are required, 3½" or 4" was usually the smallest possible diameter for the inserted tooth type cutter, whereas the present design, as stated before, makes possible an end milling cutter of the inserted tooth type as small as 1½" in diameter.

It is believed that the foregoing description conveys a good understanding of the objects and advantages of my invention. The appended claims have been drawn with a view to covering all legitimate modifications and adaptations.

I claim:

1. In a tool holder, the combination of a tool body having an axial hole and a plurality of circumferentially spaced substantially radial slots provided therein, the slots being in acute angle relation to one another and extending longitudinally inwardly from one end of said body, whereby the body portions between slots form resilient tool clamping jaw portions of wedge shaped cross-section, cutting tools adapted to be disposed in said slots so as to project from the body for use, a center pin fitting tightly in said axial hole but normally having a predetermined clearance radially with respect to the radially inner side of said tool clamping jaw portions, said pin serving as a locating abutment for the inner ends of the tools disposed in the slots, and means for forcing said jaw portions substantially radially inwardly toward engagement with said pin whereby to clamp the cutting tools in said slots in tight contact with said pin.

2. In a tool holder, the combination of a tool body having an axial hole and a plurality of circumferentially spaced substantially radial slots provided therein, the slots being in acute angle relation to one another and extending longitudinally inwardly from one end of said body, whereby the body portions between slots form resilient tool clamping jaw portions of wedge shaped cross-section, cutting tools adapted to be disposed in said slots so as to project from the body for use, a center pin fitting tightly in said axial hole but normally having a predetermined clearance radially with respect to the radially inner side of said tool clamping jaw portions, and screws entered loosely in substantially radial holes provided in said jaw portions and threaded in registering holes provided in said center pin, whereby to cause said jaw portions to be contracted into engagement with said pin and clamp the cutting tools in said slots.

3. An end milling cutter of the inserted tooth type comprising a body member having a center bore provided therein, radial slots provided in the said body member resulting in slightly flexible jaws therebetween, a centralizing abutment plug pressed in the center bore in said body member, inserted tooth cutting members inserted in the said slots to be clamped by the said jaws, and clamping screws passing through said jaws and threaded in said centralizing plug to close said jaws thus clamping said inserts in a secure position with the aid of the centralizing plug.

4. A milling cutter of the inserted tooth type comprising a body member of relatively small diameter, formed at one end to fit the spindle of a milling machine, the other end being provided with a bore substantially co-axial with the body member, a radial abutment clamping member inserted in the bore in said body member, slots in the cutting end of said body member defining radially yieldable clamping jaw portions therebetween in the cutting end portion of said body member, inserted tooth cutters set in said slots with the back end butting against the back end of the slot, and the bottom end butting against the radial abutment clamping member, and means for closing the jaws substantially radially on the inserted tooth cutting members to clamp the latter and against said radial abutment clamping member to form therewith a rigid body.

5. A milling cutter of the inserted tooth type comprising a body member of relatively small diameter, formed at one end to fit the spindle of a milling machine, the other end being provided with a bore substantially co-axial with the body member, a radial abutment clamping member inserted in the bore in said body member, slots in the cutting end of said body member defining radially yieldable clamping jaw portions therebetween in the cutting end portion of said body member, inserted tooth cutters set in said slots with the back end butting against the back end of the slot, and the bottom end butting against the radial abutment clamping member, and clamping screws passing freely through holes in the jaw portions and threaded in the radial abutment clamping member for closing said jaws on said cutting members.

6. An end milling cutter of the inserted tooth type comprising a body member of relatively small diameter formed at one end to mount in the spindle of a milling machine and provided with an axial bore, the other end of said body member having slots provided therein which are of increased width for a predetermined distance from the extremity of the body member, whereby to define locating shoulders at the inner end of said enlarged portions, the slots with the bore defining a series of flexible clamping portions on said body, a radial abutment member inserted in said bore, inserted tooth cutters set in said slots with the back end butting against said locating shoulders and the bottom end butting against the radial abutment member, whereby to locate the cutters endwise and radially relative to said body member, and means for compressing the slotted end portion of said body member against the radial abutment member whereby to clamp the inserted tooth cutters between said flexible clamping portions and make the latter rigid with the body.

7. A milling cutter comprising a body member of relatively small diameter formed at one end to mount in the spindle of a milling machine and provided with an axial bore, a pin entered in said bore, cutter members located radially by abutment with the periphery of said pin, clamping jaws flexible with respect to said body for abutment with the opposite sides of said cutter members, and substantially radially disposed screws for fastening said jaws to said pin to clamp the cutter members and make said jaws rigid with the body.

8. An end milling cutter of the inserted tooth type comprising a body member of relatively small diameter formed at one end to mount in the spindle of a milling machine, a radial abutment for cutter members on the other end of said body member, cutter members located radially by abutment on the latter, clamping jaws flexible with respect to said body for abutment with the opposite sides of said cutter members, and substantially radially disposed screws for fastening said jaws to said radial abutment to clamp the cutter members and make said jaws rigid with the body.

9. An end milling cutter of the inserted tooth type comprising a body member having a center bore provided therein, substantially radial slots provided in said body member in transverse planes defining wedge-shaped clamping jaws therebetween which are slightly flexible radially, a centralizing abutment plug inserted in the center bore in said body member, inserted tooth cutting members inserted in said slots to be clamped by said jaws, and clamping screws passing through said jaws and threaded in said centralizing plug to close said jaws and clamp the inserted tooth cutting members in rigid relation to the centralizing plug.

10. An end milling cutter of the inserted tooth type comprising a body member having a center bore provided therein, radial slots provided in said body member opening from one end thereof defining slightly flexible jaws therebetween, said slots being of increased width for a predetermined distance from the end of the body member, whereby to define locating shoulders at the inner end of said enlarged portions, a centralizing abutment plug inserted in the center bore in said body member, inserted tooth cutting members inserted in the widened portions of said slots in abutment at their inner end with said locating shoulders for location endwise with respect to said body member and engaging the centralizing plug for location radially relative to said body member, and clamping screws passing through said jaws and threaded in said centralizing plug to close said jaws and clamp said inserts in rigid relation to the centralizing plug.

11. An end milling cutter of the inserted tooth type comprising a body member having a center bore provided therein, substantially radial slots provided in said body member in transverse planes opening from one end thereof defining wedge-shaped clamping jaws therebetween which are slightly flexible radially, said slots being of increased width for a predetermined distance from the extermity of said body member whereby to define locating shoulders at the inner end of said widened portions, a centralizing abutment plug inserted in the center bore in said body member, inserted tooth cutting members inserted in said slots to be clamped by said jaws, said cutting members having abutment at their inner ends with said locating shoulders for location endwise with respect to said body member, and having abutment with said centralizing plug for location radially relative to said body member, and clamping screws passing through said jaws and threaded in said centralizing plug to close said jaws and clamp the inserted tooth cutting members in rigid relation to the centralizing plug.

JOHN H. GRAYSON.

REFERENCES CITED

The following references are of record in the file of this patent:

UNITED STATES PATENTS

| Number | Name | Date |
|---|---|---|
| 1,186,794 | Johansen | Jan. 13, 1916 |
| 1,484,207 | Campbell | Feb. 17, 1924 |
| 1,117,946 | Fox | Nov. 17, 1914 |
| 1,349,153 | Hoerner | Aug. 10, 1920 |